United States Patent [19]

Peer et al.

[11] 4,169,241
[45] Sep. 25, 1979

[54] OVERVOLTAGE PROTECTED DE-BOOST REGULATOR

[75] Inventors: John C. Peer; Robert J. Gries; Leroy W. Nero, all of Indianapolis, Ind.; Wolfgang F. W. Dietz, New Hope, Pa.

[73] Assignee: RCA Corporation, New York, N.Y.

[21] Appl. No.: 875,530

[22] Filed: Feb. 6, 1978

[51] Int. Cl.² .......................................... H01J 29/70
[52] U.S. Cl. .................................. 315/411; 358/190; 358/243; 361/91
[58] Field of Search ................ 315/408, 411; 358/190, 358/243; 361/91

[56] References Cited

U.S. PATENT DOCUMENTS 3,970,780   7/1976   Minoura ............................... 315/411

Primary Examiner—Theodore M. Blum
Attorney, Agent, or Firm—Eugene M. Whitacre; Paul J. Rasmussen; William H. Meise

[57] ABSTRACT

An electronic regulator produces a regulated direct voltage less than the raw direct voltage input. The load on the regulated output is the primary winding of the horizontal output transformer of a television horizontal deflection circuit. A secondary winding of the output transformer is connected in series with the source of raw direct voltage. An energy storage capacitor is coupled across the secondary winding, and charged therefrom by a gated rectifier. The regulated output voltage is taken across the raw direct voltage source and capacitor. An overvoltage protection circuit for protecting against fault conditions is provided. The protection circuit includes a diode coupled between the regulated output voltage terminal and the raw input voltage terminal. The diode is normally back-biased and becomes conductive when a fault condition makes the regulated voltage exceed the raw input voltage. A resistor in series with the secondary winding controls circulating currents in the event of an overvoltage fault.

6 Claims, 2 Drawing Figures

OVERVOLTAGE PROTECTED DE-BOOST REGULATOR

BACKGROUND OF THE INVENTION

This invention relates to voltage regulators for supplying voltage to a load circuit, and particularly to protection of the load from the effects of overvoltage under fault conditions.

In order to avoid the weight and cost of a line isolation transformer, television receivers may be supplied with power directly from the AC power line through a rectifier and filter. The filtered direct voltage will vary in proportion to the variations in the AC power line voltage, which may be undesirable. Also, the value of the filtered direct voltage will be approximately the peak value of the alternating-current input, which may be greater or less than the desired value.

It is possible to produce a regulated output voltage of lesser magnitude than the raw DC input by use of a series-pass regulator circuit, but this has the disadvantage of substantial power dissipation when the load current and the difference between the raw voltage and the regulated voltage are large. It is known from U.S. Pat. No. 3,881,135 issued Apr. 29, 1975 in the name of Wolfgang Dietz to produce a boosted regulated voltage in a television receiver by coupling a transformer winding and controlled rectifier in series with the raw DC input. The transformer winding is driven by the horizontal deflection circuit, and the resulting alternating voltage is controllably rectified and filtered to produce the regulated output voltage. In the Dietz arrangement, the load is protected against excessive regulated voltage by a clamp arrangement including a zener diode and an SCR which clamps the boosted regulated output voltage to the raw input voltage when the difference between the two exceeds the zener voltage.

In order to reduce voltage stresses on horizontal output transistors, it may be desirable to have the regulated output voltage less than the raw DC voltage. This is accomplished by a de-boost arrangement, by which the raw voltage is reduced to a lower regulated voltage by means of a transformer winding, controlled rectifier and capacitor. It is desirable to provide overvoltage protection of the de-boost regulator to prevent damage to the horizontal output transistor in case of overvoltage faults.

SUMMARY OF THE INVENTION

A voltage regulator includes a source producing an unregulated direct voltage at a first terminal relative to a reference point. A source of alternating voltage and a capacitance are interconnected with the source of unregulated voltage by a controlled switch for producing the regulated voltage. The regulated voltage is produced at a second terminal relative to the reference point, and the magnitude of the regulated voltage is less than that of the unregulated voltage. An overvoltage protection circuit prevents the voltage at the second terminal from exceeding the unregulated voltage. The overvoltage protection circuit includes a unidirectional current conducting device coupled between the first and second terminals and poled to conduct when the voltage at the second terminal exceeds that at the first terminal. The overvoltage protection circuit also includes a resistance serially coupled with the source of alternating voltage.

DESCRIPTION OF THE INVENTION

Figure 1:
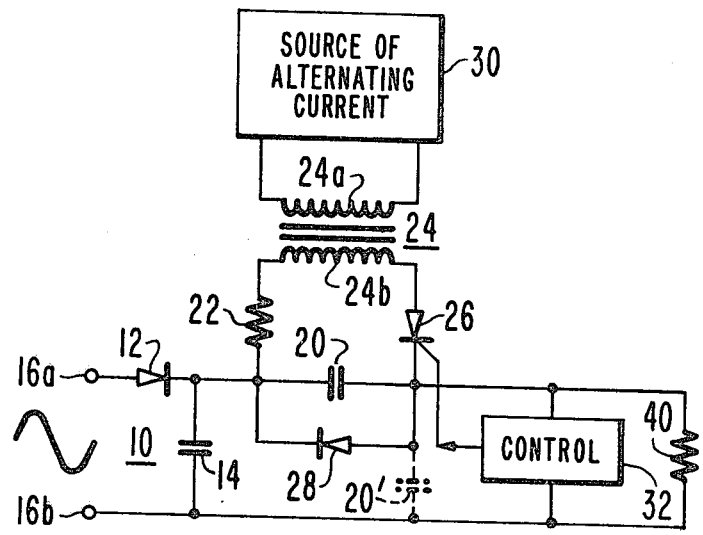
FIG. 1 illustrates, generally in block and schematic diagram form, a power supply regulator embodying the invention.

In FIG. 1, a power supply designated generally as 10 and including a rectifier 12 and filter capacitor 14 is energized from a pair of terminals 16a and 16b coupled to an alternating current line, not shown. Terminal 16b serves as a reference terminal for the regulator circuit. The junction of diode 12 and capacitor 14 is coupled by a capacitor 20 to a load represented by resistor 40. Capacitor 20 is paralleled by a series circuit including a low-value resistor 22, the secondary winding 24b of a transformer 24 and the anode-cathode path of an SCR 26. Capacitor 20 is also paralleled by a diode 28, having its anode coupled to the junction of capacitor 20 and resistor 40.

Primary winding 24a of transformer 24 is driven by a source of alternating current illustrated as block 30. An SCR control circuit illustrated as block 32 is coupled across load 40 and to the gate of SCR 26.

In operation, raw or unregulated direct voltage appears across capacitor 14. An alternating voltage is produced across the terminals of secondary winding 24b and is applied as a direct voltage to capacitor 20 by SCR 26 acting as a controlled rectifier. The voltage across load 40 is the algebraic sum or combination of the voltage across capacitor 14 and the voltage across capacitor 20.

Thyristor or SCR 26 is periodically rendered nonconductive when the voltage produced on winding 24b makes the anode of the SCR negative with respect to its cathode. During those intervals in which the voltage at winding 24b makes the anode of the SCR positive with respect to its cathode, the SCR remains nonconductive until a pulse is applied to its gate from control circuit 32. Control circuit 32 produces gate pulses timed relative to the alternating voltage on winding 24b and thereby controls the relative duration of conduction of SCR 26 in response to the regulated voltage across load resistor 40 to maintain the regulated voltage constant regardless of variations in load impedance or variations in the unregulated direct voltage.

Diode 12 is poled to make the unregulated direct voltage across capacitor 14 positive with respect to reference terminal 16b. If SCR 26 were a simple rectifier, capacitor 20 would tend to charge with its negative plate on the left (as shown in FIG. 1) and positive on the right, and the regulated voltage would exceed or be more positive than the voltage across capacitor 14. On the other hand, if SCR 26 were held nonconducting, capacitor 20 would charge through load 40 to the opposite polarity. Control circuit 32 is adjusted for a level of conduction in SCR 26 which maintains the regulated voltage less positive than the raw voltage, which is to say with the left plate of capacitor 20 (as shown in FIG. 1) at a positive potential relative to the right plate.

Under certain fault conditions, as where SCR 26 degenerates to a diode, the voltage across load 40 will tend to rise. Where substantial alternating peak voltage is available across winding 24b, the voltage rise across the load terminals may be destructive. An increase of the voltage across the load terminals above the raw input voltage is prevented by diode 28, which becomes forward biased and provides a low impedance path from load circuit 40 to capacitor 14.

Resistor 22 limits the short-circuit current of secondary winding 24b when SCR 26 is highly conductive and diode 28 is conductive. Resistor 22 may as is known be connected on the other side of winding 24b, or may be incorporated as internal resistance of winding 24b. Also, as is known, capacitor 20 may alternatively be connected in parallel with load circuit 40 as shown by dotted capacitor 20'.

Figure 2:
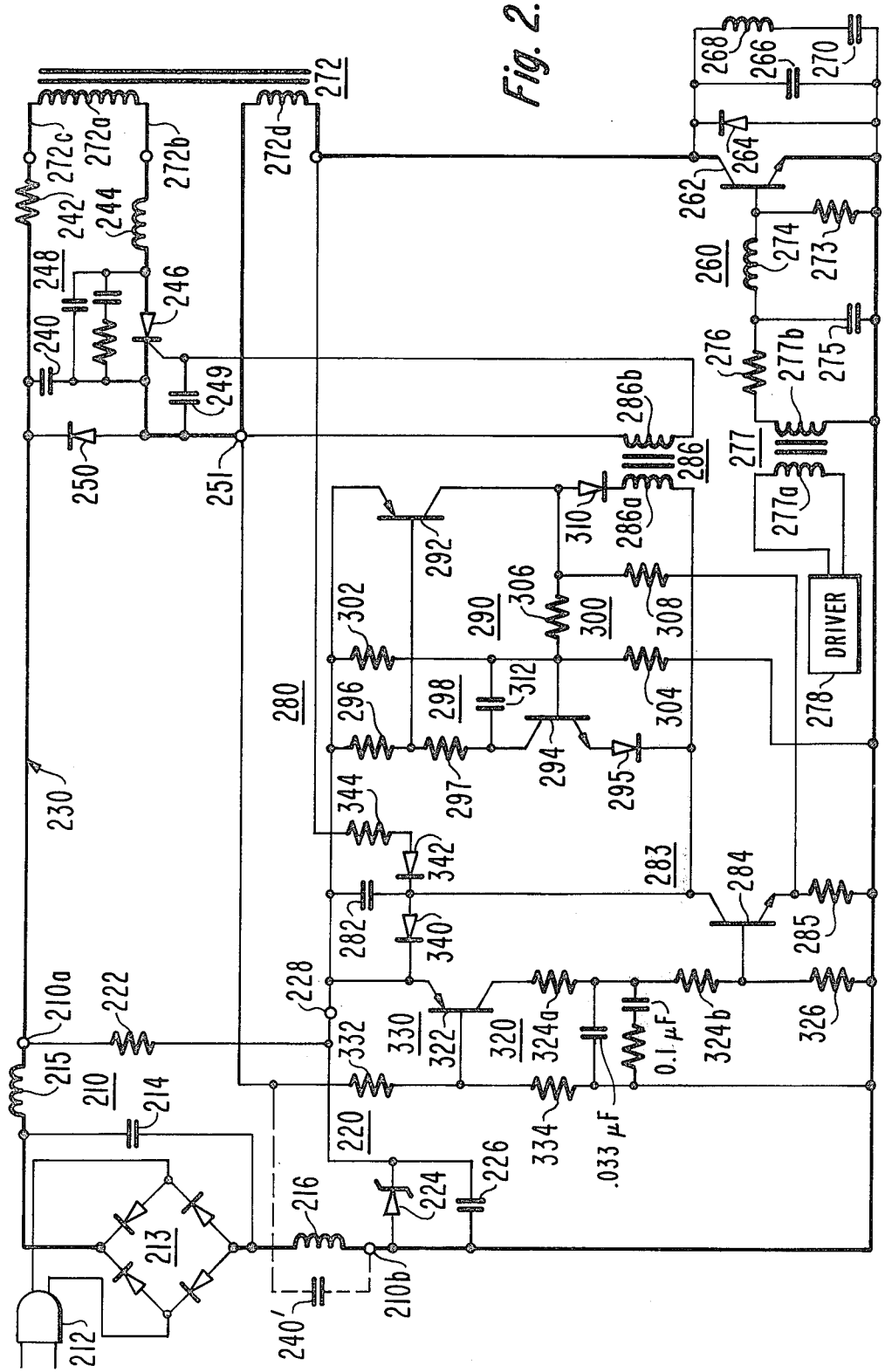
FIG. 2 is a more detailed block and schematic diagram of a power supply regulator embodying the invention.

FIG. 2 is a detailed circuit diagram illustrating a practical application of the principle of the circuit of FIG. 1 to a television receiver, in which source 30 and resistor 40 are the horizontal deflection circuit. In FIG. 2, a source 210 of raw or uncontrolled voltage includes a plug 212 by which alternating voltage may be applied to the terminals of a full-wave bridge rectifier designated generally as 213 for rectification. A filter capacitor 214 is coupled across the diagonally opposite corners of bridge rectifier 213 to filter the rectifier output. A first end of capacitor 214 is coupled to a terminal 210a by a radio frequency interference (RFI) filter inductance 215, and the other end of capacitor 214 is coupled to a terminal 210b by an RFI filter inductance 216. The raw DC appears at terminal 210a relative to reference terminal 210b, hereinafter called "ground."

A shunt regulator designated generally as 220 is coupled between terminal 210a and ground. Regulator 220 includes a series dropping resistor 222 having one end coupled to terminal 210a and the other end coupled to a zener diode 224 having its anode connected to ground. A capacitor 226 is coupled across diode 224 for noise reduction. The zener-regulated output voltage of regulator 220 appears at a terminal 228 relative to ground.

The raw direct voltage appearing at terminal 210a is combined by means of a conductor 230 with the voltage across a filter capacitor 240. The sum voltage is applied at a terminal 251 to a load circuit consisting of a winding 272d of a transformer 272 and NPN horizontal output transistor 262 of a horizontal deflection circuit 260. Transistor 262 has its emitter coupled to ground, and its collector-emitter path is paralleled by a damper diode 264, retrace capacitor 266 and the serial combination of a horizontal deflection winding 268 and an S-shaping capacitor 270. The base-emitter junction of transistor 262 is paralleled by a resistor 273. The base of transistor 262 is coupled by a series inductor 274, shunt capacitor 275 and series resistor 276 to a secondary winding 277b of a drive transformer 277. Primary winding 277a is driven from a driver circuit shown generally as block 278 having an input from other portions of the television receiver, not shown.

Capacitor 240 is paralleled by the serial combination of a low-value current-limiting resistor 242, a secondary winding 272a of a transformer 272, an inductor 244 and the anode-cathode path of an SCR 246. A resistance-capacitance damping circuit designated generally as 248 coupled across the anode-cathode path of SCR 246 reduces the effect of switching transients. An overvoltage protection diode 250 has its cathode coupled to terminal 210a and its anode coupled to terminal 251. SCR 246 has a capacitor 249 coupled between its gate and cathode to prevent RFI.

Gate control of SCR 246 is provided by a control circuit designated generally as 280 which receives operating power from terminal 228. Circuit 280 includes a capacitor 282 coupled as an oscillator with a current source designated generally as 283 and a latching circuit designated generally as 290.

The oscillator drives the gate of SCR 246 through a transformer 286 with pulses which occur at times during the horizontal deflection interval which are variable under the control of an error amplifier designated generally as 320, to maintain a constant voltage between terminal 251 and ground and therefore across horizontal deflection circuit 260.

One end of capacitor 282 is coupled to supply terminal 228, and the other is connected to the collector of an NPN transistor 284 of current source 283. The emitter of transistor 284 is coupled to ground by a resistor 285. Latch 290 includes a PNP transistor 292 and an NPN transistor 294 having its emitter coupled to the collector of transistor 284 by a protective diode 295. The collector of transistor 294 is connected to supply by resistors 296 and 297 of a voltage divider designated generally as 298. The base of transistor 292 is connected to the tap of divider 298. The base of transistor 294 is biased by a voltage divider designated generally as 300 and including resistors 302 and 304 coupled from supply to ground. The voltage at the base of transistor 294 is controlled in part by a resistor 306 coupled between the base of transistor 294 and the collector of transistor 292, and by a resistor 308 coupled between the collector of transistor 292 and the emitter of transistor 284. The collector of transistor 292 is coupled by a diode 310 to the primary winding 286a of transformer 286. The other end of winding 286a is coupled to the collector of transistor 284. Latch 290 is slowed by an RFI suppression capacitor 312 coupled between the collector and base of transistor 294.

Error amplifier 320 includes a PNP transistor 322 having its emitter coupled to supply terminal 228 and its collector coupled by way of resistors 324a and 324b to the base of transistor 284. The base of transistor 284 is coupled to ground by a resistor 326. The base of transistor 322 is coupled to the tap of a voltage divider designated generally as 330 and including resistors 332 and 334 coupled between terminal 251 and ground, i.e., across load 260. A diode 340 has its cathode coupled to supply terminal 228 and its anode coupled to the collector of transistor 284. A diode 342 has its cathode connected to the anode of diode 340 and its anode coupled by way of a series resistor 344 to the collector of horizontal output transistor 262.

When alternating current is initially applied to plug 212, source 210 and regulator 220 produce voltages at terminals 210a and 228 is known fashion. Horizontal deflection circuit 260 is initially inoperative, and SCR 246 is nonconductive. The voltage at regulated output terminal 251 will as a consequence be lower than desired, and transistors 322 and 284 will conduct heavily, causing capacitor 282 to charge rapidly. The voltage at the collector of transistor 284 will decrease or become more negative as capacitor 282 charges, and transistor 294 will become conductive when its emitter voltage decrease below the voltage of divider 300 as modified by paralleling resistor 304 by resistors 285, 306 and 308. Conduction of transistor 294 will cause transistor 292 to become conductive. Conduction of transistor 292 raises its collector voltage, raising the voltage at the base of transistor 294 in a regenerative manner so transistor 292 becomes saturated and provides a discharge path for capacitor 282 through the primary of transformer 286 and diode 310. Saturation of transistor 292 raises the emitter voltage of transistor 284 and cuts off current from source 283, and also modifies the base voltage of transistor 294 by removing the path paralleling resistor 304 and instead paralleling resistor 302 by resistor 306.

The emitter voltage of transistor 294 rises or becomes more positive relative to ground as capacitor 282 discharges. Capacitor 282 continues to discharge until the emitter voltage of transistor 294 rises above the base voltage fixed by divider 300 and resistor 306 coupled to supply by saturated transistor 292. At that time, transistor 294 tends to reduce conduction, reducing the drive to transistor 292 and turning off transistors 292 and 294 in a regenerative manner. This restores the operation of current source 283, which again begins to charge capacitor 282.

This repetitive oscillation produces pulses across secondary winding 286b of transformer 286 which are applied to the gate of SCR 246, causing it to conduct and increase the voltage across the load. Horizontal deflection circuit 260 begins to operate in known fashion, providing horizontal deflection for the television receiver and producing retrace pulses across transistor 262 and primary winding 272d. A pulsatory voltage is induced in secondary winding 272a which periodically renders SCR 246 nonconductive. At the same time, the horizontal retrace pulses at the collector of transistor 262 are applied by way of resistor 344 and diode 342 to capacitor 282, discharging capacitor 282. Diode 340 is rendered conductive during each successive horizontal retrace interval by the excess current flowing in resistor 344 maintaining capacitor 282 discharged. This initiates a charging interval of capacitor 282 at the end of each horizontal retrace interval.

The natural or unsynchronized period of the oscillations of control circuit 280 is made to be slightly shorter than the period of the horizontal deflection. After each horizontal retrace interval during which capacitor 282 is completely discharged, capacitor 282 charges from current source 283 until transistor 294 becomes conductive and latch circuit 290 latches, as described. Capacitor 282 then discharges through winding 286a and transistor 292 until transistor 294 and latch 290 are turned off, also as described, which initiates the succeeding charging interval. After a few moments of charging, the next horizontal retrace interval discharges capacitor 282 and the cycle starts again. Thus, capacitor 282 is discharged twice during each complete regulation cycle; once when latch 290 is triggered and once during the horizontal retrace interval. This assures that the full charging cycle preceeding triggering of the latch always begins at the end of a retrace interval for stable control.

If the regulated voltage at terminal 251 relative to ground tends to increase, the increase is communicated by voltage divider 330 to the base of transistor 322 and decreases its conduction and that of transistor 284, thereby reducing the charging rate of capacitor 282. This in turn triggers latch 290 later during the oscillation cycle, allowing SCR 246 to commence conduction later and therefore to conduct for a shorter interval before being turned off by the next succeeding horizontal retrace pulse and restoring the desired voltage level in a degenerative manner. Conversely, a low voltage at terminal 251 causes increased conduction of transistors 322 and 284 and early triggering of SCR 246 during the cycle, which also restores the desired voltage.

In the event that SCR 246 degenerates to a diode, or an arc-over from a source of high potential to terminal 251 occurs, or if a regulator failure such as an open-circuit of zener 224 occurs, the voltage at terminal 251 will tend to rise. Under such a fault condition or with a kinescope arc diode 250 becomes conductive the moment the voltage at terminal 251 exceeds the raw direct voltage at terminal 210a. This couples terminal 251 to the low impedance represented by capacitor 214 and thereby prevents the voltage at terminal 251 from exceeding the unregulated input voltage.

In the absence of resistor 242, secondary winding 272a is essentially short-circuited by simultaneous conduction of SCR 246 and diode 250. The short circuit is transformer coupled to and decreases the impedance across the terminals of primary winding 272d, causing transistor 262 to draw excessive current at a time when the voltage at terminal 251 is at a voltage higher than normal. This may result in an undesirable power stressing of transistor 262 in conjunction with voltage stressing. The presence of resistor 242 not only limits the current flow in winding 272a, but presents a load to winding 272a which maintains the impedance of primary winding 272d sufficiently high to reduce the stressing. As in the case of FIG. 1, resistor 242 may be at any location in the series path including winding 272a, inductor 244 and SCR 246.

While the foregoing explanation describes capacitor 240 as being coupled between regulated voltage terminal 251 and raw voltage terminal 210a, capacitor 240 may alternatively be connected between terminal 251 and any reference voltage point, and particularly between terminal 251 and reference terminal 210b as illustrated in FIG. 2 by the dotted connections of capacitor 240'. With this alternative connection, the operation of the circuit is as described previously, but the regulated voltage across the load rather than being the sum of the voltages across capacitor 214 and 240 is the voltage across capacitor 240' alone.

In a particular embodiment of the invention, the following component values where found to give satisfactory operation:

| CAPACITORS | |
|---|---|
| 214 | 600μF |
| 240 | 1.5μF |
| 282 | 2700pF |
| 297 | 2.2pF |

| RESISTORS | OHMS | |
|---|---|---|
| 222 | 16K | 2 watt |
| 242 | 1.5 | 10 watt |
| 285 | 2200 | |
| 296 | 3900 | |
| 297 | 10K | |
| 302 | 220K | |
| 304 | 330K | |
| 306 | 150K | |
| 308 | 27K | |
| 324 | 138K | |
| 326 | 33K | |
| 332 | 47K | |
| 334 | 19.6K (adjusted) | |
| Zener 224 | 33V | |
| Inductor 244 | 110μH | |

What is claimed is:

1. In a voltage regulator of the type including a source of unregulated direct voltage having a first terminal at which said unregulated direct voltage is generated relative to a reference point;

a source of alternating voltage;

capacitance means; and controlled switch means interconnected with said source of unregulated direct voltage, said source of alternating voltage and said capacitance means for producing at a second terminal a regulated direct voltage normally of lesser magnitude than said unregulated direct voltage but which may exceed said unregulated direct voltage under fault conditions;

an overvoltage protection means for limiting the voltage appearing at said second terminal under fault conditions to substantially said unregulated direct voltage, comprising:

unidirectional current conduction means coupled between said first and second terminals and poled for conduction when the voltage at said second terminal exceeds that at said first terminal; and resistance means serially coupled with said source of alternating voltage for limiting current therein when said unidirectional current conduction means is conductive.

2. A protection circuit pursuant to claim 1 wherein said unidirectional current conduction means comprises a diode.

3. A protection circuit according to claim 1 wherein said second terminal is coupled to a television horizontal deflection circuit for energizing said deflection circuit; and said source of alternating voltage comprises means coupled to said deflection circuit for deriving alternating deflection voltage therefrom.

4. A circuit according to claim 3 wherein said means coupled to said deflection circuit comprises a transformer winding; and said resistance means is serially coupled with said transformer winding.

5. An improved overvoltage protected electronic voltage regulator, comprising:

a source of unregulated direct voltage including a first terminal at which said unregulated voltage appears relative to a reference point;

a source of alternating voltage;

capacitance means;

controlled switch means interconnected with said source of unregulated direct voltage, said source of alternating voltage and said capacitance means for producing at a second terminal a regulated direct voltage relative to said reference point, said regulated direct voltage having a lesser magnitude relative to said reference point than that of said source of unregulated direct voltage but being subject to increase upon the occurrence of fault conditions;

wherein the improvement comprises unidirectional current conduction means coupled between said first and second terminals and poled for conduction when said regulated voltage exceeds said unregulated voltage under fault conditions; and resistance means serially coupled with said source of alternating voltage for limiting current during conduction of said unidirectional current conduction means.

6. An overvoltage protected electronic voltage regulator, comprising:

a source of unregulated direct voltage including a first terminal at which said unregulated voltage appears relative to a reference point;

a source of alternating voltage;

capacitance means;

controlled rectifier means interconnected with said source of unregulated direct voltage, said source of alternating voltage and said capacitance means for producing at a second terminal a regulated direct voltage relative to said reference point, said regulated direct voltage having a lesser magnitude with respect to said reference point than that of said source of unregulated direct voltage;

a horizontal deflection circuit coupled to said second terminal and to said reference point for energization by said regulated voltage;

unidirectional current conduction means coupled between said first and second terminals and poled for nonconduction when said unregulated direct voltage exceeds said regulated direct voltage and for conduction in the event that said regulated voltage exceeds said unregulated voltage under fault conditions; and resistance means serially coupled with said source of alternating voltage for limiting current in said source of alternating voltage and in said horizontal deflection circuit during conduction of said unidirectional current conduction means.

* * * * *